United States Patent [19]

Thompson

[11] 4,349,706
[45] Sep. 14, 1982

[54] WALL MOUNTING ADAPTOR FOR TELEPHONE SET

[75] Inventor: Joseph Thompson, London, Canada

[73] Assignee: Northern Telecom Limited, Montreal, Canada

[21] Appl. No.: 143,617

[22] Filed: Apr. 25, 1980

[51] Int. Cl.³ .............................................. H04M 1/04
[52] U.S. Cl. ............................. 179/100 C; 179/146 R; 179/178
[58] Field of Search ............ 179/1 PC, 100 R, 100 C, 179/146, 147 R, 178, 179

[56] References Cited

U.S. PATENT DOCUMENTS

| | | | |
|---|---|---|---|
| 3,849,608 | 11/1974 | Bustos et al. | 179/146 R |
| 3,851,119 | 11/1974 | Tucker | 179/146 R |
| 3,859,476 | 1/1975 | Morrell et al. | 179/100 C |
| 3,898,394 | 8/1975 | Ward et al. | 179/178 |
| 4,146,292 | 3/1979 | Garrett | 339/176 M |

FOREIGN PATENT DOCUMENTS 2536437 9/1976 Fed. Rep. of Germany ...... 179/178

OTHER PUBLICATIONS

Superior Cable Advertisement; Telephony Magazine; Jan. 21, 1980.
W. J. Ruffer and W. F. Wernet; "Hands-Free Calling Goes Residential"; GTE Automatic Electric Journal; Mar. 1977; pp. 275 & 278.

Primary Examiner—Bernard Konick
Assistant Examiner—Randall P. Myers
Attorney, Agent, or Firm—Sidney T. Jelly

[57] ABSTRACT

A wall mounting adaptor for a telephone set is arranged for attachment to a wall outlet, releasably latched thereto, and the telephone set releasably attached to the adaptor. The telephone set can be a set normally for use as a desk set and can be attached to and detached from the adaptor at will, leaving the adaptor in place. Provision is made for both a line cord and a power cord, and storage means can be provided for excess line cord.

12 Claims, 5 Drawing Figures

WALL MOUNTING ADAPTOR FOR TELEPHONE SET

This invention relates to a wall mounting adaptor for a telephone set, and in particular is concerned with an adaptor which is first attached to a wall mounting outlet, the telephone set then being removeably attached to the adaptor.

It has been usual that either special models of telephones have been produced for wall mounting, or an adaptor has been attached to the telephone set, which otherwise would be suitable for desk or table top use, and the adaptor then latching on to a wall mounting outlet. With special models for wall mounting, these cannot be removed, at will, and used as desk or table top sets. With sets which were for desk or table use and which have had adaptors attached thereto, again these sets generally cannot be removed from the wall and used on a desk or table.

This restricts the mobility of telephone sets, and with the development of new telephone sets which provide additional features, such as repertory dialling, visual functions, and other features, the tendency is to avoid special models, because of cost. Also, as the sets are expensive, users prefer to have a single set and plug it in whenever required at any particular time. As a result wall use is difficult, if not impossible, to provide, with a single set. However, in some situations, such as kitchens, workshops, and places of entertainment, often the most suitable position for mounting is on a wall. Consumer resistance is met to the need for two different telephones.

The present invention provides a wall mounting adaptor for a telephone set, the adaptor attaching to the normal wall outlet, but being such that it can remain in place at all times, while a telephone set, which may be of a table or desk top form, is removeably attached to the adaptor. If desired, when the telephone set is removed, a cover can be attached to the adaptor, and, conveniently, such a cover can be used to hold a note pad, calendar or some other item.

Broadly, the invention provides a wall mounting adaptor having means for attachment to a standard wall outlet, releasable latch means for retaining the adaptor attached to the outlet, provision for a modular line cord for plugging in to the outlet at one end and in to the telephone set at the other, releasable latch means for retaining a telephone set in the adaptor, and provision for a power line cord, for plugging in to the telephone set and a power outlet, if a separate power supply is required for the telephone set. Storage means may be provided for excess length of line cord, permitting use of a standard line cord if desired.

The invention will be readily understood by the following description of an embodiment, and variations thereof, in conjunction with the accompanying drawings, in which.

Figure 1:
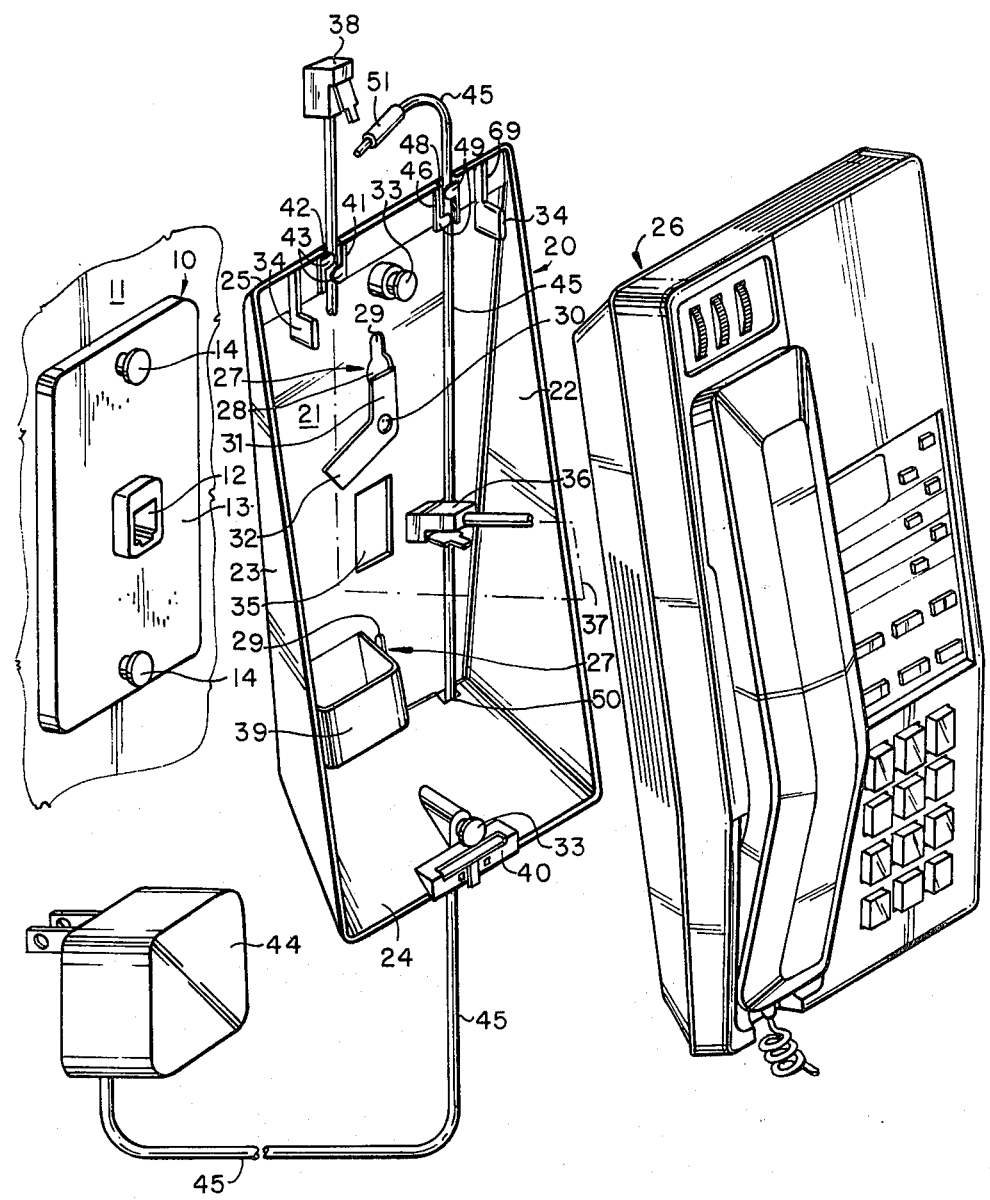
FIG. 1 is an exploded perspective view, illustrating a wall outlet, wall mounting adaptor, telephone set, and power supply cord and plug.

As illustrated in FIG. 1, a wall outlet 10 is affixed to wall 11 and has a modular jack 12. The wall outlet is basically a flat plate 13 and has two headed studs 14. The modular jack extends through an aperture in the plate 13. An example of such a jack is described in U.S. Pat. No. 3,860,316.

The wall mounting adaptor is indicated generally at 20 and comprises a shallow box-like housing having a back or web 21, sides 22 and 23, a bottom 24, and a very narrow top 25. As will be seen when considering FIG. 3, the back is not actually flat against the wall but is inset slightly for most of its area, within the sides 22 and 23. The illustration of the adaptor 20 in FIG. 1 is not in any detail and does not attempt to show all details, being only to illustrate the relationship between wall outlet 10 and the telephone set indicated at 26.

The adaptor attaches to the wall outlet by means of two key-hole apertures 27 having circular portions 28 and narrower stem portions 29. The circular portions 28 pass over the heads of the studs 14 and then the thinner main portions or stems of the studs pass up the stem portions 29. This is obtained by a downward movement of the adaptor after positioning over the studs. A swinging latch 30, having a latch portion 31 and a tail portion 32, is swung to clear the latch portion 31 from the upper aperture 27 while attaching the adaptor to the wall outlet. Once the adaptor is in position, the latch is allowed to swing back and the latch portion 31 is vertically below the head of the stud 14 preventing upward movement of the adaptor. This prevents untoward movement and possible removal of the adaptor from the wall outlet while removing a telephone set from the adaptor.

The adaptor is also provided with headed studs 33 for mounting or attachment of the telephone set 26 via key-hole apertures in the base of the telephone set. Locating ribs 34 can be provided, extending outward from the back surface 21 and engage in slots in the base of the telephone set 26. An aperture 35 in the back 21 permits a modular plug 36 to be inserted into the jack 12 when the adaptor is in position. The plug 36 is on one end of a line cord indicated in chain dotted line at 37, and a further plug 38 is on the other end of the line cord and plugs into a jack in the telephone set. Instead of a special, short, line cord, a normal, 7 ft. cord can be used and the excess cord wound up and pushed into a storage loop 39. A latch 40 is provided at the center of the edge of the bottom 24, the latch engaging within an aperture in the base of the telephone set. Without release of the latch 40 it is not possible to move the telephone set upwards to disengage it from the studs 33.

As will be seen in FIG. 1, the adaptor is tapered, as seen in side view, being deeper at the bottom than at the top. However, this can be varied. The telephone only insets into the adaptor by a very small amount and is thus slightly inclined, upward and backward. The actual shape of the adaptor can vary in accordance with the shape of the telephone set to be mounted. In the present example the sides 22 and 23 and the bottom 24 are inclined outwardly relative to the back 21.

The line cord is positioned in a retaining formation defined by walls 41 at the top of the adaptor. The walls define a recess or channel 42 and two small ribs or tabs 43 extend over the channel, one at each side. The line cord is slipped under the tabs. It is possible that a telephone set being mounted on the adaptor will require a separate power supply. In FIG. 1 a power supply plug including a transformer, is indicated at 44, the power cord indicated at 45. The power cord is retained at the top by a formation defined by walls 46, similar to those for the line cord. A channel 48 is formed and tabs 49 extend over the channel. An aperture 50 is formed in the bottom 24. The power cord extends up inside the adaptor, the cord terminating in a plug 51 which is inserted into the telephone set.

Figures 2, 3:
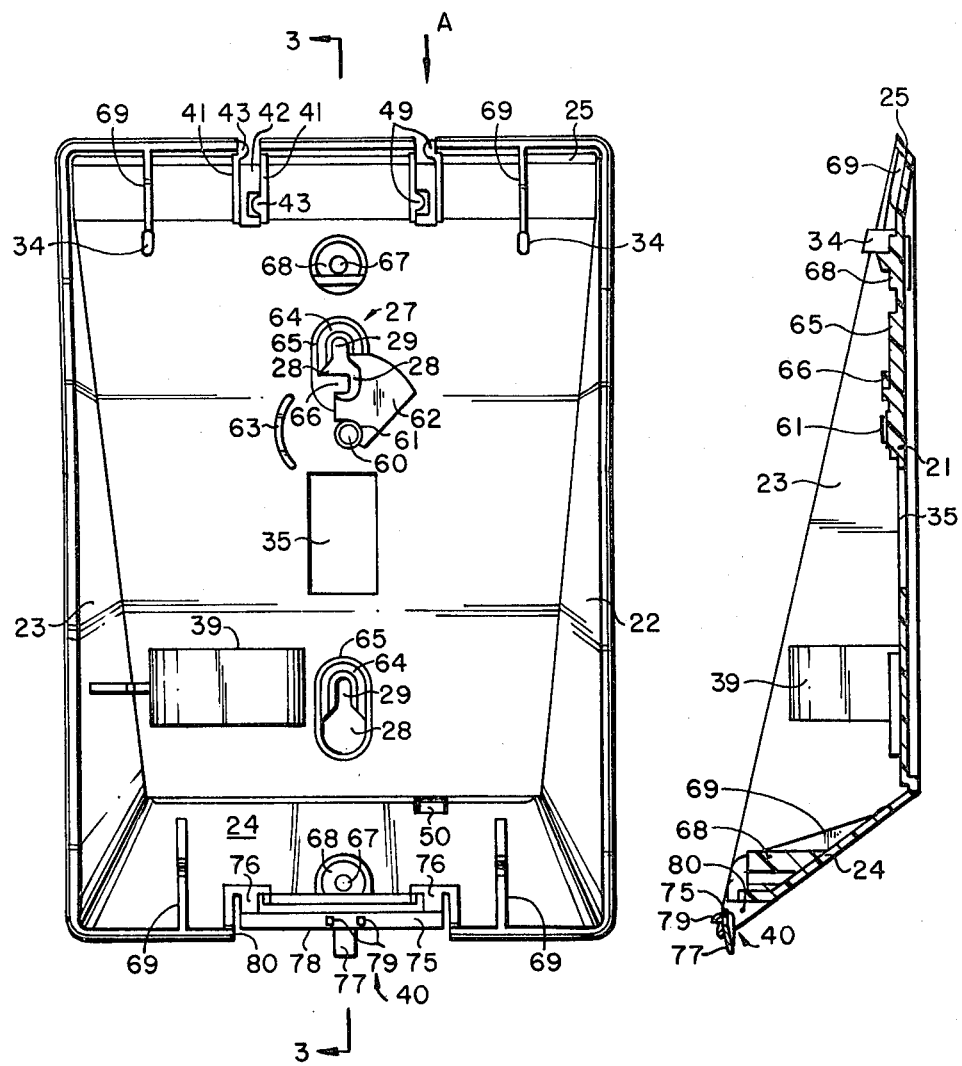
FIG. 2 is a front view of the adaptor.
FIG. 3 is a cross-section on the line 3—3 of FIG. 2.
Figure 4:
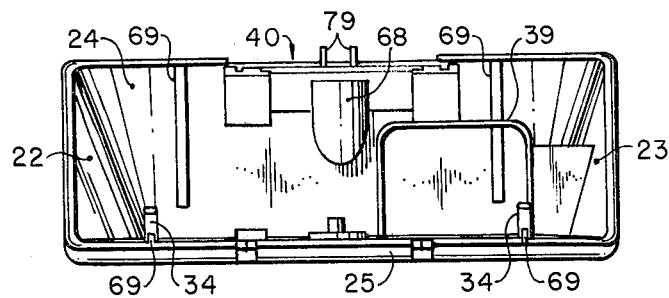
FIG. 4 is a top view of the adaptor, in the direction of arrow A in FIG. 2.
Figure 5:
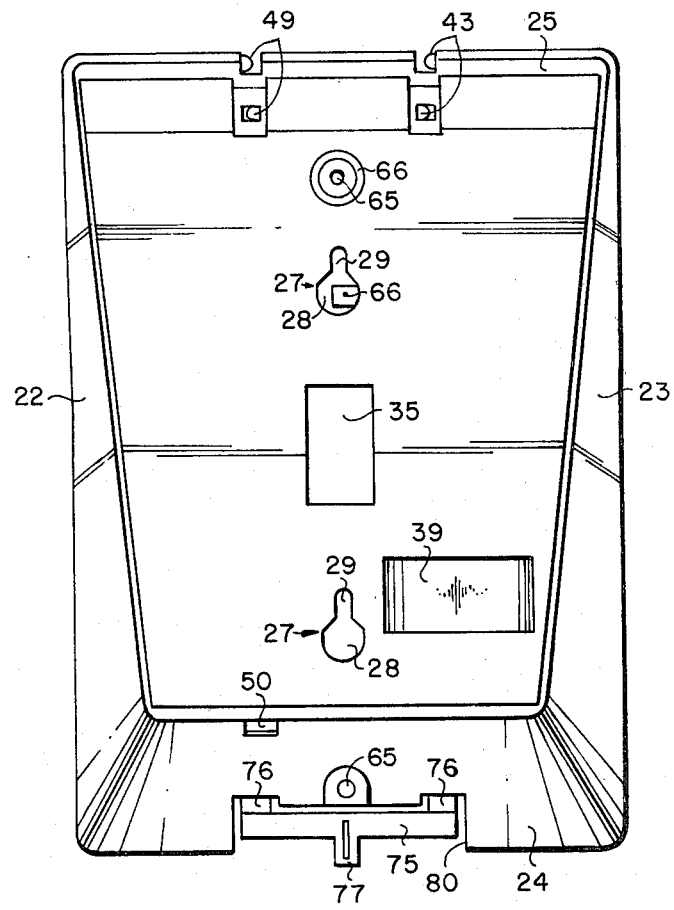
FIG. 5 is a back view of the adaptor.

FIGS. 2, 3, 4 and 5 illustrate the adaptor 20 in more detail. FIG. 2 is a front view and the various features identified in FIG. 1 are also identified in this Figure. Seen in more detail is the position for the swinging latch 30. The latch is retained, as an example, by a screw screwing into the bore 60 of a boss 61. An arcuate recessed area 62 is provided in the back 21 and an arcuate rib 63 is formed on the back, on which the tail portion 32 of the latch slides. The areas around the key-hole apertures 27 are raised slightly to form recesses for the heads of the headed studs. There are, in the example illustrated, two raised levels, an intermediate level 64 on which the undersurface of the stud head rests, and a top level 65 which surrounds the stud head when it is in position. For the top aperture a small web 66 extends and the latch portion 31 of the swinging latch moves under this web.

The headed studs 33, FIG. 1, which act as attachments for the telephone set 26 are not fitted in FIGS. 2, 3, 4 and 5. Bores 67 are shown, in bosses 68. The studs 33, which have threaded shanks, are attached to the adaptor by screwing into the bores 67. Strengthening webs 69 can be provided at top and bottom and these webs can also provide alignment.

The latch 40 at the bottom, comprises a lateral bar 75 with two extensions 76, one at each end. A lever 77 extends downward in the center. On the front surface 78 of the bar 75 one or two teeth or dogs 79, of triangular shape viewed from the side. The latch is positioned in a recess 80 in the bottom 24 of the adaptor. The teeth 79 engage in an aperture in the back of the telephone set and prevent upward movement of the set, to any significant amount, unless the latch is moved to disengage the teeth. The latch is "pivotted" by flexure, for example by flexing of the extensions 76, and possibly also by flexing or distortion of the bar 75.

In use, the application is as follows. A standard modular jack wall outlet 10 will be available on a wall. The adaptor, with the studs 33 and latch 30 fitted, is applied to the wall outlet, the heads of the studs 14 passing through portions 28 of apertures 27, the latch 30 having been swung across, in a clockwise direction in FIG. 1. The adaptor is then slid down so that the shanks of the studs 14 pass into the portions 29 of the apertures 27, the heads of the studs resting on the portions or levels 64 around the apertures. The latch 30 is then allowed to swing back, the latching portion 31 resting under the flap 66 and below the stud 14 in the upper aperture 27. A line cord 37 is fitted, one end in the retaining formation 41, having sufficient length to plug into the telephone set 26 when fitted. The plug 36 at the other end of the line cord is inserted into the jack 12 of the outlet and any excess cord coiled up and pushed into the storage loop 39.

The telephone set is applied by presenting the back of the set to the adaptor, first the upper end to locate on the locating ribs 34, if provided, then pivoting down so that the headed studs pass through keyhole apertures in the telephone set base. As the set is pushed against the adaptor the latch 40 is flexed, (to the right in FIG. 3). The set is moved down to cause the shanks of the studs 33 to move into narrow portions of the key-hole apertures in the set base—these apertures being similar to apertures 27 in the adaptor. As the set moves to the lowest position, the latch 40 moves back and the teeth 79 engage in the aforemention aperture in the telephone set base. The plug 38 on the line cord is inserted in the jack in the telephone set and it is intalled.

To remove the set, the plug 38 is pulled out, the latch 40 released by pushing back on lever 77 and the set slid up to disengage studs 33. The set is then moved forward.

If a separate power supply is required, a power cord or line 46 is provided, extending up the back of the adaptor and plugged in to the set after it is attached to the adaptor. The power cord is unplugged prior to removing the set.

When a telephone set is not in position in the adaptor, the power cord is preferably removed. The line cord can also be removed, or just pulled out of the retaining formation 41 and all coiled up and put in the storage loop 39. A cover can then be positioned on the adaptor, if desired. Use can be made of the headed studs 33 to attach the cover. If it is desired to remove the adaptor, the latch 30 is swung out of engagement with the upper stud 14, the adaptor slid up and then moved away from the wall outlet. The plug 36 will have been removed from the jack 12.

What is claimed is:

1. A wall mounting adaptor for a telephone set, comprising:
    an open shallow box-like housing having a back, two sides, top and bottom;
    means in said back for attaching the housing to a telephone wall outlet;
    a first latch pivotally mounted on said housing for releasably retaining the housing attached to the telephone wall outlet;
    first retaining means on said housing for retention of a telephone line cord;
    attachment means on said housing for attaching a telephone set to said housing, said attachment means interengaging with a base of a telephone set and comprising headed studs projecting forward from said back of said housing, each stud including a head portion and a stem for entrance through and positioning in a key-hole shaped aperture in the base of the telephone set;
    a second latch on said housing for releasable engagement with said telephone set for releasably retaining said telephone set attached to said housing, said second latch including at least one forward extending projection for engagement with an aperture in said base; and
    an aperture in said back for passage of said line cord plug therethrough for insertion in a jack in said telephone wall outlet.

2. An adaptor as claimed in claim 1, said means for attaching the housing to said outlet comprising two key-hole shaped apertures in said back, each aperture including a circular portion and a narrow stem portion extending upward from the circular portion, the arrangement such that an enlarged head of a stud on said telephone wall outlet passes through said circular portion and a stem of the stud passes up into said stem portion on downward movement of the adaptor.

3. An adaptor as claimed in claim 2, said first latch pivotally mounted on said back, below and adjacent to one of said apertures, and including a latching portion movable from a first position clear on said aperture to a second position over said circular portion of said aperture, the arrangement such that said latch portion is aligned with the stem of a stud extending through said aperture, when the adaptor is attached to a wall mounting, upward movement of the adaptor being prevented.

4. An adaptor as claimed in claim 1, including storage means for excess line cord.

5. An adaptor as claimed in claim 1, including an aperture in said back and positioned to align with a modular jack in said telephone wall outlet.

6. An adaptor as claimed in claim 1, said second releasable latch comprising a laterally extending bar, and an extension at each end of said bar connecting said bar to the adaptor, and said at least one forward extending projection located on a front face of said bar for engagement in said aperture in the base of the telephone set, to prevent upward movement of the telephone set, the latch of flexible material, release of the latch provided by flexure of the latch to disengage said projections.

7. An adaptor as claimed in claim 1, the sides of the housing extending forwardly and outwardly from said back, each side being deeper at its connection with said bottom than at its connection with said top, said bottom extending forward and downwardly.

8. An adaptor as claimed in claim 7, said attachment means for attachment of a telephone set comprising two studs, each stud having a head portion, said studs spaced vertically apert on a central axis of said housing, a first stud mounted on said back adjacent to said top and a second stud mounted on said bottom.

9. An adaptor as claimed in claim 1, including alignment members for alignment of a telephone set with the housing.

10. An adaptor as claimed in claim 1, further including second retaining means on said housing, for retention of a power cord.

11. An adaptor as claimed in claim 10, said retaining means for a line cord and a power cord each comprising a channel at the top of the housing, and tabs extending over said channel for retention of a cord in the channel.

12. A wall mounting adaptor for a telephone set, comprising:

a shallow box-like housing having a back, two sides and a top and a bottom;

means for attaching the housing to a telephone wall outlet, said means comprising two key-hole shaped apertures in said back, each aperture including a circular portion and a narrow stem portion extending upward from the circular portion, the arrangement such that an enlarged head of a stud on said telephone wall outlet passes through said circular portion and a stem of the stud passes up into said stem portion on downward movement of the housing relative to said telephone wall outlet;

a first releasable latch pivotally mounted on said back, below and adjacent to one of said apertures, said latch including a latch portion and a tail portion positioned on either side of the pivot axis of the latch, the latch portion movable by actuation of said tail portion, from a first position clear of said aperture to a second, latching, position over said circular portion of said aperture, said tail portion within said housing, the latch portion in said latching position aligned with the stem of a stud extending through said aperture, upward movement of the housing being prevented;

first retaining means integral with said housing for retention of a line cord;

second retaining means integral with said housing for retention of a power cord separate from said line cord;

attachment means for attachment of a telephone set to the housing, said attachment means comprising studs projecting forward, each stud having a head portion and a stem for entrance through and positioning in a key-hole shaped aperture in a base of the telephone set;

a second releasable latch on said housing for retaining said telephone set attached to said housing, said second latch including at least one forward extending projection for engagement with an aperture in said base.

* * * * *